March 10, 1964 H. T. ATWOOD 3,124,083
MOLD FOR PIE SHELLS
Filed Aug. 30, 1961

INVENTOR
HAROLD T. ATWOOD
By Benjamin Schlosser
Atty.

ature of this Patent Office 3,124,083
Patented Mar. 10, 1964

3,124,083
MOLD FOR PIE SHELLS
Harold T. Atwood, 11129 Eggleston Ave., Chicago 28, Ill.
Filed Aug. 30, 1961, Ser. No. 134,882
2 Claims. (Cl. 107—15)

This invention relates to a mold for pie shells, and is particularly concerned with means for improving the quality of pie shells, for reducing the cost thereof, and for increasing the length of time the pie shell may be kept without turning rancid.

It is an object of this invention to provide a mold adapted to press a predetermined quantity of dough in a metal foil pan into a pie shell of uniform thickness extending to the full outside diameter of the pan without leaving any scrap dough. The uniformity of thickness of the pie shell throughout its area and the absence of any reworked dough in the mix improves the quality of the completed pie because it permits the crust to bake evenly.

Another object of the invention is to provide means to facilitate separation of the movable mold member from the pie shell after the molding operation. The mold includes means for forming a thin cushion of hygienically clean air between the movable mold member and the adjacent surface of the pie shell. The movable upper mold member is heated to about 250° F. to facilitate forming the pie shells. Air under pressure is forced into the upper mold member and passes through vertical bores in the bottom of the upper mold member into the molding cavity. The air passes close to the heating element and is heated sufficiently to kill all bacteria, and is thus made hygienically clean. The air forms a cushion between the dough and the lower surface of the upper mold member. This cushion of air eliminates any possibility of the dough sticking to the movable upper mold member since the movable upper mold member never actually touches the dough as the dough is molded into a pie shell.

Another object of the invention is to provide a mold capable of improving the quality of the pie shell and prolonging its useful life by protecting the exposed surface of the pie shell with a thin protective film that does not deleteriously affect the taste of the completed pie. When the dough is pressed into shape by the mold, the heat of the mold breaks down the shortening used in the pie shell dough. The oil from the shortening rises to the top of the dough and forms a thin protective film on the top surface of the pie shell. When the pie shell and metal foil pan are removed from the mold the only part of the pie shell that is exposed to the air is the top surface, and it is protected by the thin film.

Exposure of ordinary pie shells to the air causes activation of the bacteria in the dough, thereby causing the pie shells to become rancid and moldy after a few days. The thin protective film over the exposed surface of the pie shell made in the mold of the present invention impedes access of the air to the dough, and thereby delays the activation of the bacteria in the dough. My improved pie shell will not become rancid or moldy until after exposure to the air for several days longer than the exposure time sufficient to make conventional pie shells moldy.

The thin protective film also prevents the dough from becoming soggy when the pie shell is filled because the juice from the filling does not penetrate the film.

The structure by means of which the above mentioned and other advantages of the invention are attained will be described in the following specification, taken in conjunction with the accompanying drawing illustrating a preferred embodiment of the invention, in which.

Figure 1:
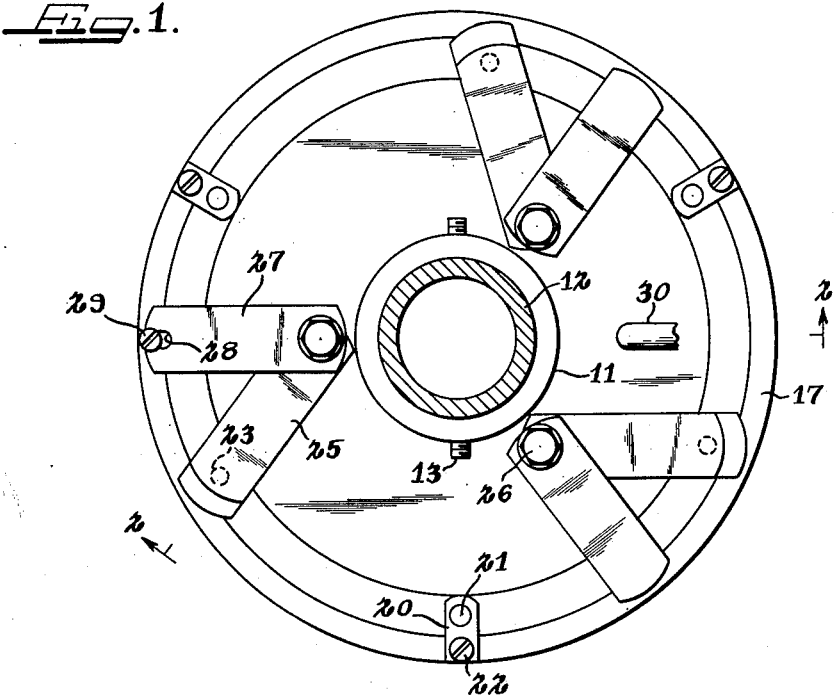
FIG. 1 is a top plan view of a mold embodying the invention.
Figure 2:
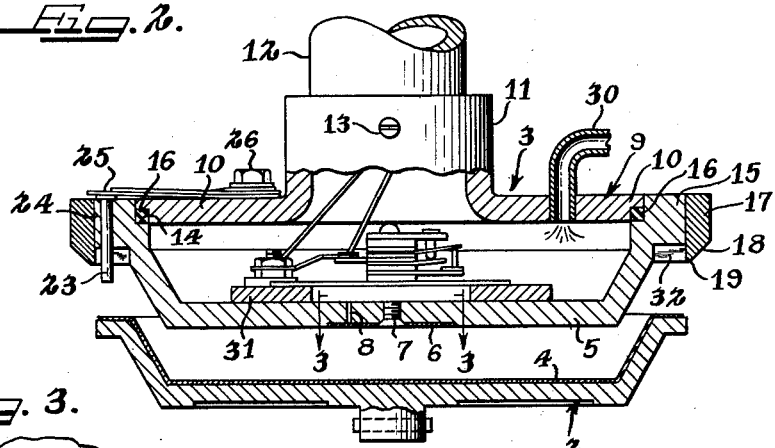
FIG. 2 is a cross sectional view, taken along the line 2—2 of FIG. 1.
Figure 3:
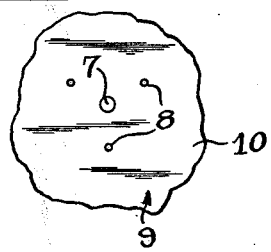
FIG. 3 is a fragmentary top plan view taken in the plane indicated by the line 3—3 of FIG. 2.

Referring to the drawing, the mold comprises a lower stationary mold member 2 and a movable upper mold member 3 that is reciprocated vertically in vertical alignment with the lower mold member. A metal foil pan 4 fits in the lower mold member and serves as an outer protective covering for the pie shell after it is formed. A measured quantity of dough to form the pie shell is placed in the pan 4 and is pressed into the desired shape by the upper mold member. The pie shell remains in the metal foil pan and the pie is baked in the metal foil pan. The metal foil pan remains with the pie until the pie reaches the consumer.

The movable upper mold member has a bottom 5 having its outer surface shaped to correspond to the configuration of the inner surface of lower mold member 2. The center portion of the lower face of the bottom 5 is recessed to receive a thin circular disc 6 that is rigidly secured at its center to the bottom 5 by means of a screw 7 or similar securing member. The disc 6 is thin enough to flex at its peripheral edge portions, and its lower surface is normally flush with the lower face of the bottom 5. A plurality of bores 8 extend through the bottom 5 in alignment with the peripheral edge portions of the disc 6. Although three bores 8 are shown, the number thereof may be varied. Preferably the bores 8 are concentrically arranged relative to screw 7 and are spaced radially at equal intervals to provide a uniform flow of air around the peripheral edges of the disc 6.

The top 9 of the movable upper mold member 3 comprises a flat annular plate 10 having a centrally disposed upstanding neck 11 adapted to be secured to a vertically reciprocable ram 12 by any suitable means such as, for example, a plurality of set screws 13. The outer edge portions of plate 11 seat on an internal annular shoulder 14 on the upper edge 15 of the bottom 5. Preferably an annular seal 16 is positioned on shoulder 14 beneath the outer edge portion of the plate 10. A ring 17 is slidably fitted against the outer surface of the upper edge 15 of the bottom 5.

The lower edge of the ring 17 is preferably beveled, as indicated at 18, to form a thin bottom edge 19. When the upper mold member 3 is moved downwardly to mold the dough in pan 4, the bottom edge 19 of ring 17 engages the upper surface of pan 4 to form a closed cavity between the upper and lower mold members. Metal strips 20, rigidly secured to upper edges 15 by rivets 21, extend over the top of ring 17 and are secured thereto by screws 22. The strips 20 limit the relative vertical movement between the ring and the upper mold member and carry the ring 17 upwardly with the upper mold member 3 when the upper mold member is raised.

Stripper pins 23 extend through vertical bores 24 in the upper edge 15 of the bottom 5. The stripper pins are pressed downwardly by flat springs 25 secured at one end to the top plate 10 by screws 26. Each screw 26 also secures one end of a flat spring 27 to the plate 10. The outer edge of each spring 27 is recessed, as indicated at 28, to engage the top of ring 17 under the head of a screw 29 projecting upwardly from the top of ring 17. The springs 27 exert downward pressure against the top of ring 17 to hold it in engagement with the upper surface of the pan 4 when the upper mold member is in its lowermost position.

An air inlet 30 extending through the plate 10 is connected to a source of air under pressure to provide a constant flow of air into the interior of the movable upper mold member 3. An annular heating element 31 is mounted on the upper surface of the bottom 5 of the upper mold member. The heating element surrounds the area of the bottom 5 through which the bores 8 extend. The heating element heats the movable upper mold member to a temperature of about 250° F. to properly form the pie shell when the dough in pan 4 is pressed between the upper surface of the pan 4 and the upper mold member. The air flowing from the inlet 30 passes over the heating element 31 to reach the bores 8, and is heated by said heating element to a temperature high enough to kill all the bacteria. Therefore the air is hygienically clean when it passes through the bores 8.

The air forces the outer edges of disc 6 downwardly and flows uniformly from the narrow opening between the peripheral edges of the disc and the lower surface of the movable upper mold member to form a cushion of air across the lower face of the upper mold member. The pressure of the air flowing through the bores 8 holds the outer edges of the disc downwardly until the cavity between the upper and lower molds is closed. After the cavity is closed by the engagement of the bottom edge 19 of the sealing ring 17, the pressure of the air constituting the air cushion across the lower face of the upper mold increases until it equals the pressure of the air flowing through the bores 8. When the air pressure on both sides of the disk 6 is equal, the resilience of the disc 6 will cause it to snap back into closed position against the underside of bottom 5. This cushion of air keeps the dough from sticking to the upper mold member. This eliminates the necessity of sprinkling flour over the mix to prevent sticking to the upper mold members. The use of flour to prevent the dough from sticking to the mold adds resistance to the flow of the dough, and thus prevents the user from maintaining the consistency of the mix that is desirable in producing pie shells that must be kept in frozen storage for various lengths of time.

The heat to which the pie shell is subjected during the molding operation breaks down the shortening used in the mix, and causes the oil from the shortening to rise to the top surface of the dough as it is molded into the form of a pie shell. This oil forms a thin tasteless film over the top surface of the pie shell that effectively seals the exposed surface of the pie shell to protect it from the air and thus prevent the activation of bacteria in the dough for a long period of time. Pie shells made in the manner hereinabove described may be kept in unfrozen condition for several days longer than conventional pie shells before they will become rancid.

The lower surface of the upper edge 15, which overlies the outer edge of pan 4, is preferably serrated, as indicated at 32, to provide a serrated upper edge surface for the pie shell. The serrations also provide space for any slight excess of dough when too much dough is placed in the pan 4. This enables the pie shells to have a uniform thickness even when slight errors are made in the amount of dough placed in the pan 4 for the molding operation.

Although I have described a preferred embodiment of my invention in considerable detail, it will be understood that the description is intended to be illustrative, rather than restrictive, as many details may be modified or changed without departing from the spirit or scope of my invention. Accordingly, I do not desire to be restricted to the exact structure described.

I claim:

1. A mold comprising a lower mold member adapted to hold a pan, an upper mold member having a closed top and having a bottom shaped to fit within said lower mold member, a sealing ring slidably mounted on the peripheral edge of said upper mold member, said sealing ring having a lower edge engageable with the upper surface of a pan positioned in said lower mold member to form a closed cavity prior to the interengagement of said upper and lower mold members as said upper mold member is moved toward said lower mold member, an air inlet extending through the top of said upper mold member, said air inlet being connected to a source of air under pressure, said bottom having a plurality of vertical bores extending therethrough, means in said upper mold member for hygienically cleaning the air therein, and a valve secured to the bottom of said upper mold member in registration with all of said bores to control the flow of said hygienically clean air into said closed cavity.

2. A mold comprising a lower mold member adapted to hold a pan, an upper mold member having a closed top and having a bottom shaped to fit within said lower mold member, a sealing ring slidably mounted on the peripheral edge of said upper mold member, said sealing ring having a lower edge engageable with the upper surface of a pan positioned in said lower mold member to form a closed cavity prior to the interengagement of said upper and lower mold members as said upper mold member is moved toward said lower mold member, an air inlet extending through the top of said upper mold member, said air inlet being connected to a source of air under pressure, said bottom having an air passageway extending therethrough, a heating element within said upper mold member surrounding one end of said air passageway, whereby air flowing from said inlet into said passageway must pass in close adjacency to said heating element, said heating element being adapted to heat said air sufficiently to destroy bacteria in said air, and a valve secured to the bottom of said upper mold member in registration with said air passageway to control the flow of air into said closed cavity.

References Cited in the file of this patent
UNITED STATES PATENTS 2,396,406    Anderson _____ Mar. 12, 1946

FOREIGN PATENTS 731,058    Great Britain _____ June 1, 1955
868,813    Great Britain _____ May 25, 1961